United States Patent
Burns

(10) Patent No.: US 10,794,521 B2
(45) Date of Patent: *Oct. 6, 2020

(54) FAUCET WITH INTEGRATED PUSH-TO-CONNECT FITTING

(71) Applicant: Reliance Worldwide Corporation, Atlanta, GA (US)

(72) Inventor: William J Burns, Dandenong South Vic (AU)

(73) Assignee: Reliance Worldwide Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,123

(22) Filed: Oct. 24, 2019

(65) Prior Publication Data
US 2020/0056705 A1   Feb. 20, 2020

Related U.S. Application Data

(63) Continuation of application No. 15/843,186, filed on Dec. 15, 2017.

(51) Int. Cl.
*F16L 37/091* (2006.01)
*F16K 5/06* (2006.01)
(Continued)

(52) U.S. Cl.
CPC ............ *F16L 37/0915* (2016.05); *B21K 1/24* (2013.01); *E03C 1/021* (2013.01); *F16K 1/04* (2013.01);
(Continued)

(58) Field of Classification Search
CPC . F16L 37/0915; F16L 37/091; F16L 37/0925; F16L 37/025; F16K 1/02;
(Continued)

(56) References Cited

U.S. PATENT DOCUMENTS 1,115,696 A * 11/1914 Linbarger ............... E03C 1/042
285/64
1,214,220 A * 1/1917 Regar ....................... F16L 5/00
285/46
(Continued)

FOREIGN PATENT DOCUMENTS

| CN | 204277132 U | 4/2015 | |
| WO | WO-2015/125386 A1 | 8/2015 | |
| WO | WO-2015125386 A1 * | 8/2015 | .......... F16L 37/0915 |

OTHER PUBLICATIONS

Non-Final Office Action on U.S. Appl. No. 15/843,186 dated May 16, 2019 (24 pages).
(Continued)

*Primary Examiner* — David Colon-Morales
(74) *Attorney, Agent, or Firm* — Foley & Lardner LLP

(57) ABSTRACT

A valve assembly includes a body, a fitting, and a stopper assembly. The body has a first end and a second end. The body includes a connector portion positioned at the first end, a nozzle portion positioned at the second end, and an intermediate portion connecting the connector portion to the nozzle portion. The connector portion includes a peripheral wall having a crimped end that defines a fluid inlet. The nozzle portion defines a fluid outlet. The connector portion, the intermediate portion, and the nozzle portion cooperatively define a fluid flow path extending from the fluid inlet to the fluid outlet. The fitting is disposed within the peripheral wall. The fitting is held within the peripheral wall by the crimped end. The stopper assembly is coupled to the body along the intermediate portion. The stopper assembly is configured to facilitate selectively restricting a flow along the fluid flow path.

17 Claims, 8 Drawing Sheets

(51) Int. Cl.

| | | |
|---|---|---|
| *E03C 1/02* | (2006.01) | |
| *F16K 31/60* | (2006.01) | |
| *F16L 37/02* | (2006.01) | |
| *F16K 1/32* | (2006.01) | |
| *F16K 27/02* | (2006.01) | |
| *F16K 1/04* | (2006.01) | |
| *F16K 1/48* | (2006.01) | |
| *F16K 1/10* | (2006.01) | |
| *B21K 1/24* | (2006.01) | |

(52) U.S. Cl.
 CPC ................ *F16K 1/10* (2013.01); *F16K 1/32* (2013.01); *F16K 1/487* (2013.01); *F16K 5/06* (2013.01); *F16K 5/0689* (2013.01); *F16K 27/02* (2013.01); *F16K 31/60* (2013.01); *F16L 37/025* (2013.01)

(58) Field of Classification Search
 CPC ..... F16K 1/04; F16K 1/06; F16K 1/08; F16K 1/10; F16K 1/48; F16K 1/482; F16K 1/485; F16K 1/487; F16K 27/02; F16K 31/50; F16K 5/06; E03C 1/021
 See application file for complete search history.

(56) References Cited

U.S. PATENT DOCUMENTS

| | | | |
|---|---|---|---|
| D52,919 S | 1/1919 | Mittinger | |
| 1,482,484 A * | 2/1924 | Roberts ................ | F16K 41/02 251/218 |
| 1,878,288 A ‡ | 9/1932 | Mohr ..................... | F16K 27/02 251/142 |
| 1,878,569 A | 9/1932 | Zolleis | |
| 1,939,911 A * | 12/1933 | McCune .............. | B60T 17/043 251/256 |
| 2,210,375 A * | 8/1940 | Mueller ................ | F16K 1/02 251/271 |
| 2,887,295 A ‡ | 5/1959 | Bredtschneider ....... | F16K 1/42 251/359 |
| 2,997,054 A ‡ | 8/1961 | Woodford ............ | E03C 1/104 137/218 |
| D205,438 S | 8/1966 | Hansen | |
| 3,414,001 A | 12/1968 | Woodford | |
| D223,647 S | 5/1972 | Cornelius | |
| 3,711,063 A * | 1/1973 | Gibbs .................. | F16K 31/50 251/276 |
| 4,244,556 A ‡ | 1/1981 | Miller .................... | F16K 1/02 251/118 |
| 4,523,740 A | 6/1985 | Paitchell | |
| 4,722,558 A ‡ | 2/1988 | Badoureaux ........ | F16L 37/091 285/242 |
| 4,860,784 A ‡ | 8/1989 | Petersen ................ | F16K 1/02 137/315.28 |
| 5,174,611 A ‡ | 12/1992 | Byrd .................... | F16L 33/227 285/305 |
| 5,480,122 A ‡ | 1/1996 | Barker ................... | E03C 1/02 137/614 |
| 5,482,329 A * | 1/1996 | McCall ................ | F16L 41/14 137/318 |
| 5,551,735 A ‡ | 9/1996 | Takayanagi .......... | F16L 33/22 285/243 |
| 5,588,681 A * | 12/1996 | Parks .................. | E03C 1/025 137/359 |
| 6,065,491 A ‡ | 5/2000 | Rider .................. | E03C 1/042 137/359 |
| 6,216,722 B1 | 4/2001 | Solomon | |
| 6,378,910 B1 ‡ | 4/2002 | Maiman ................ | F16L 5/10 137/359 |
| 6,382,592 B1 ‡ | 5/2002 | Kim ..................... | F16K 1/04 251/215 |
| 6,502,364 B2 ‡ | 1/2003 | Richardson ........... | E03C 1/021 52/220.8 |
| D513,310 S | 12/2005 | Kulig | |
| 7,409,964 B2 ‡ | 8/2008 | Hoeptner, III ........ | F16K 1/04 137/218 |
| 7,530,606 B1 ‡ | 5/2009 | Yang ................... | F16K 5/0626 285/340 |
| 7,942,161 B2 ‡ | 5/2011 | Crompton ............ | E03C 1/042 137/315.13 |
| 8,272,396 B2 ‡ | 9/2012 | Brienza ................ | E03C 1/021 137/360 |
| 8,469,337 B1 ‡ | 6/2013 | Hoeptner, III ........ | F16K 1/04 251/214 |
| 8,491,012 B2 ‡ | 7/2013 | LeQuere ............ | F16L 37/0915 285/340 |
| 9,228,681 B2 ‡ | 1/2016 | Kluss .................. | F16L 37/091 |
| 10,072,783 B2 ‡ | 9/2018 | Gledhill ............... | F16L 37/091 |
| D830,122 S | 10/2018 | Seiders et al. | |
| 10,214,883 B2 ‡ | 2/2019 | Chapla ................. | E03B 9/025 |
| D861,834 S | 10/2019 | Foster et al. | |
| D873,967 S | 1/2020 | Ozburn | |
| 2002/0167164 A1 ‡ | 11/2002 | Thomas ................ | E03C 1/042 285/46 |
| 2003/0057701 A1 ‡ | 3/2003 | Koo .................... | F16L 37/0915 285/307 |
| 2004/0021120 A1 | 2/2004 | Turnau, III et al. | |
| 2008/0149873 A1 ‡ | 6/2008 | Cimberio ............ | F16K 5/0647 251/149.6 |
| 2010/0072744 A1 ‡ | 3/2010 | Xie ...................... | F16K 5/0626 285/33 |
| 2011/0025054 A1 ‡ | 2/2011 | Kluss .................. | F16L 37/0915 285/351 |
| 2011/0140417 A1 ‡ | 6/2011 | Kluss .................. | B25B 27/10 285/345 |
| 2012/0074695 A1 ‡ | 3/2012 | Salehi-Bakhtiari ......... F16L 37/0915 285/377 | |
| 2014/0062078 A1 ‡ | 3/2014 | Weissmann .......... | F16L 13/116 285/80 |
| 2014/0182709 A1 | 7/2014 | Janousek | |
| 2015/0345683 A1 | 12/2015 | Crompton et al. | |
| 2016/0033065 A1 ‡ | 2/2016 | Graham ............... | F16L 37/091 285/335 |
| 2017/0307119 A1 ‡ | 10/2017 | Taniguchi ............. | F16K 27/00 |
| 2017/0321827 A1 ‡ | 11/2017 | Lee ...................... | E03C 1/042 |
| 2018/0266604 A1 ‡ | 9/2018 | Yang .................... | F16K 27/02 |
| 2018/0291597 A1 ‡ | 10/2018 | Hunt .................... | E03C 1/042 |
| 2019/0186642 A1 * | 6/2019 | Burns ................... | F16K 5/0689 |

OTHER PUBLICATIONS

Notice of Allowance on U.S. Appl. No. 15/843,186 dated Dec. 4, 2019.
International Search Report and Written Opinion for PCT/US2018/065661 dated Mar. 22, 2019 (10 pages).
Non-Final Office Action on U.S. Appl. No. 15/843,186 dated Mar. 4, 2020 (16 pages).
U.S. Office Action on U.S. Appl. No. 29/710,473 dated Jun. 12, 2020 (7 pages).

\* cited by examiner
‡ imported from a related application

FAUCET WITH INTEGRATED PUSH-TO-CONNECT FITTING

CROSS-REFERENCE TO RELATED PATENT APPLICATION

This application is a continuation of U.S. patent application Ser. No. 15/843,186, filed Dec. 15, 2017, which is incorporated herein by reference in its entirety.

FIELD

The present disclosure relates generally to the field of valves for use in directing fluid flow for a fluid service.

BACKGROUND

During construction of a building (e.g., a house), the plumbing set-up for the building includes providing piping (such as a water pipe) to a location out of a wall where a fluid service will be provided. Typically, an installer will position and install a valve (e.g., a sillcock) on the pipe, for example, by screwing the valve onto an end of the pipe. In order for the valve to correctly function, the valve must be properly dimensioned and located on the end of the pipe such that an end of the valve presses tight against the siding or wall of the building, so as to secure the valve to the wall of the building, to prevent the valve from falling off the wall, and to prevent fluid leakage.

Additionally, if the end of the pipe is cut too short prior to installing the valve, the valve and/or pipe will leak. If installation of the valve is performed incorrectly, then additional time and material expenses will be incurred to rectify the error. The installation process is costly and labor intensive, at least because the installer is required to both screw the valve onto the pipe but also must take extra time to inspect the pipe and valve assembly to ensure correct installation of the valve.

SUMMARY

Certain exemplary aspects of the present disclosure include devices and methods which advantageously mitigate the risk of errors in installation of valves onto fluid pipes and which decrease the amount of time required for installation. The following presents a general summary of aspects of the present disclosure. This summary is not an extensive overview of the disclosure and is not intended to identify key or critical elements of the invention or to delineate the scope of the present disclosure. The following summary merely presents some concepts of the present disclosure in a general form as a prelude to the more detailed description provided below.

According to one aspect of the present disclosure, a valve assembly includes a body having a fluid inlet disposed on a first end of the body and a fluid outlet disposed on a second end of the body, the body housing a sealing ring, and the fluid outlet being configured to be in fluid connection with the fluid inlet. The valve assembly further includes a push-to-connect fitting which is integral to the body, the push-to-connect fitting being configured to connect to an end of a pipe, a stem configured to seal the body in a first position and configured to allow fluid to flow from the fluid inlet of the body to the fluid outlet in a second position; and a connector surrounding at least part of the push-to-connect fitting. The push-to-connect fitting, in conjunction with the sealing ring, is configured to communicate the fluid inlet with the end of the pipe. The push-to-connect fitting is configured to provide a seal between the fluid inlet and the end of the pipe.

According to a further aspect of the present disclosure, a method of manufacturing a valve includes the steps of forging a body, the body comprising a first end and at least one end segment; machining the body to form a fluid inlet at the first end of the body and a fluid outlet at a first end segment of the at least one end segment of the body, an inner segment, an inner wall, and an interior fluid channel defined by the first end and the at least one end segment; installing a sealing ring within the inner segment of the body; installing a push-to-connect fitting within the inner segment of the body such that the push-to-connect fitting is configured to secure to an end of a pipe; securing the push-to-connect fitting within the inner segment of the body by a crimp formed in the inner wall; and installing a tubular member within an inner diameter of the push-to-connect fitting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to the present disclosure. The various concepts introduced above and discussed in greater detail below may be implemented in any of numerous ways, as the described concepts are not limited to any particular manner of implementation.

At least one aspect of the present disclosure relates to a valve which includes an integrally formed push-to-connect fitting for securing the valve to a fluid service. Such an assembly allows for lower costs and ease of installing the valve to the fluid service.

Figure 1:
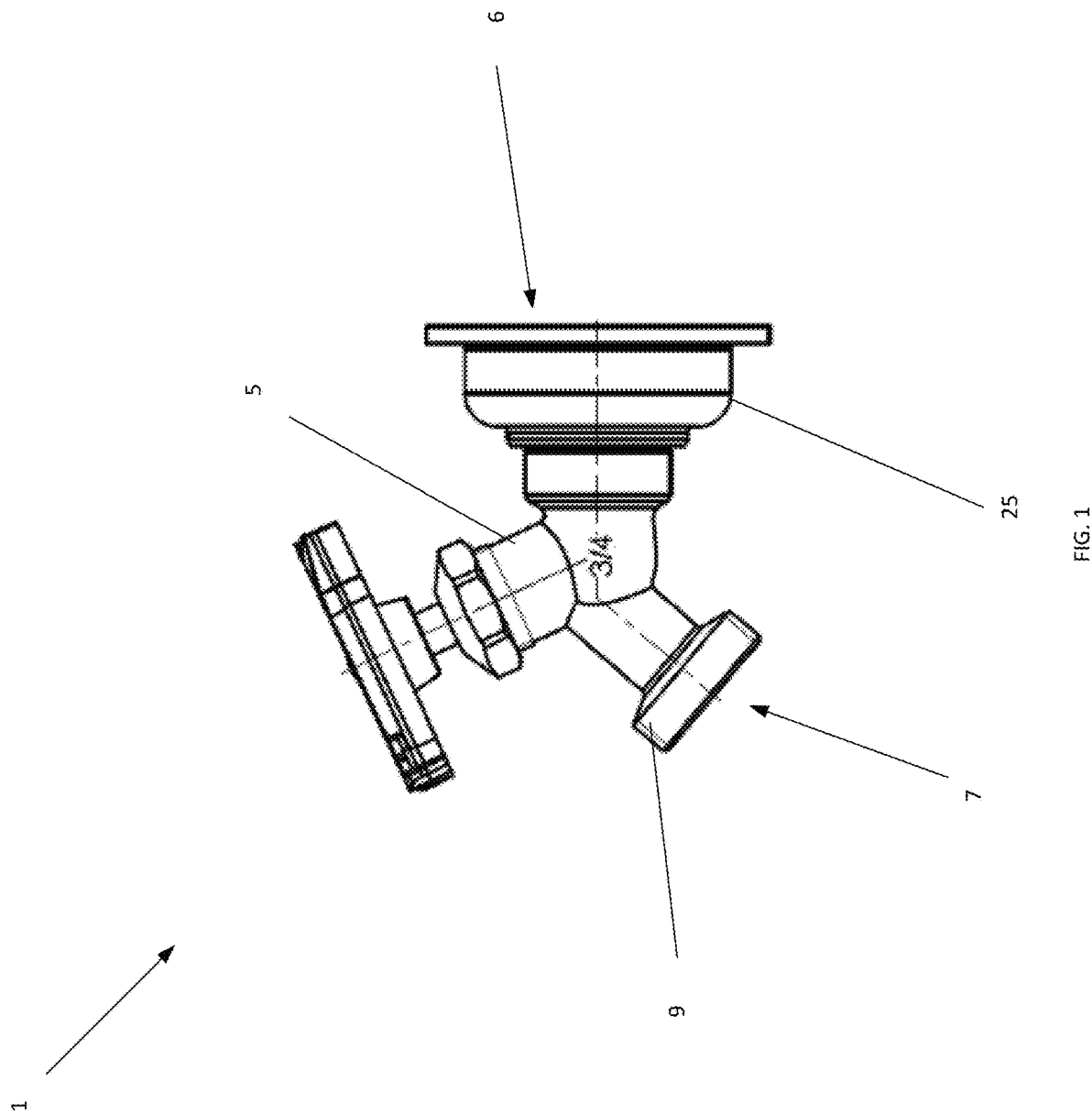
FIG. 1 is a side view of a sillcock, according to an exemplary implementation.
Figure 2:
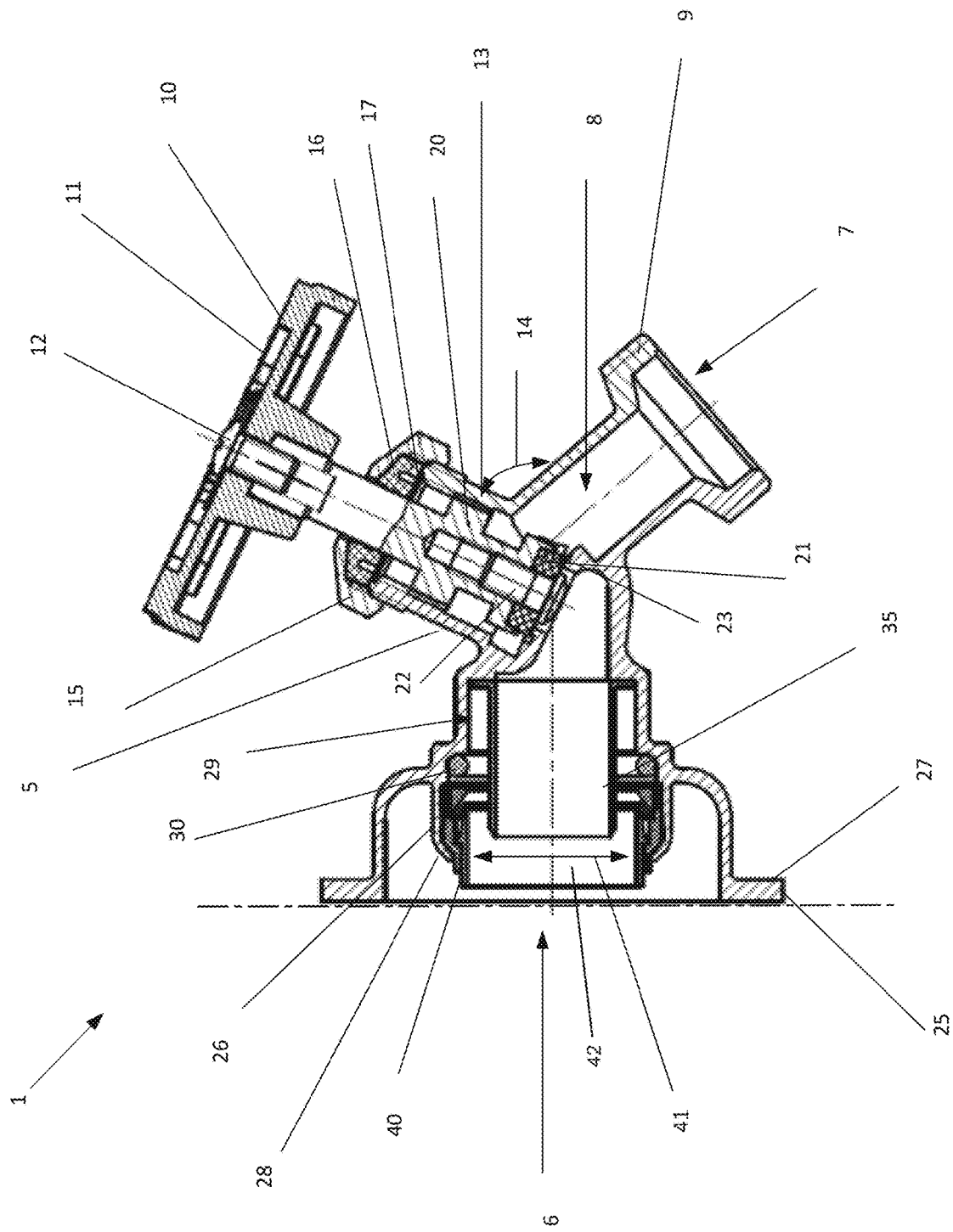
FIG. 2 is a side cross-sectional view of the sillcock shown in FIG. 1 in a first orientation.
Figure 3:
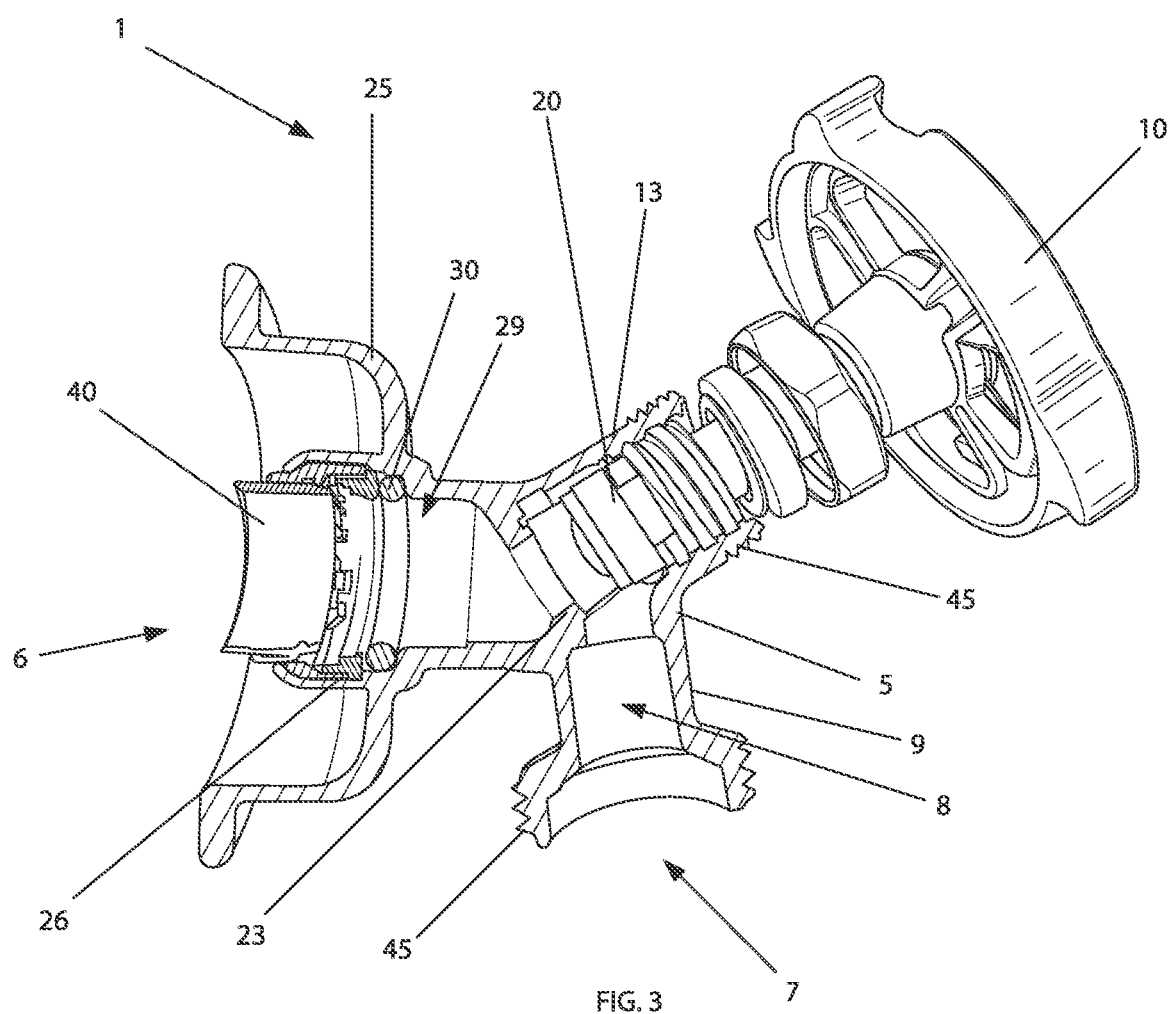
FIG. 3 is side cross-sectional view of a sillcock in a second orientation, according to an exemplary implementation.

Referring to FIGS. 1-3, according to an exemplary implementation of the present disclosure, a valve (e.g., sillcock, faucet, etc.) 1 includes a body 5. The body 5 includes a fluid inlet 6 disposed at a first end of the body 5 and configured to be fluidly connected to a fluid service (for example, an end of a pipe providing water). The body also includes a fluid outlet 7 disposed at a second end of the body 5 in fluid connection to the fluid inlet and configured to deliver a fluid to a user.

As shown in FIG. 2, the fluid inlet 6 and the fluid inlet 7 define a fluid channel (such as a fluid flow passageway) 8 disposed within and/or through an interior portion of the body 5. The body is formed of any suitable material (e.g., brass), and is formed by any suitable process, including forging and/or machining. Further, as shown in FIG. 2, the body 5 includes at least one end segment, such as end segment 13 and end segment 9. The end segment 13 and the end segment 9 are positioned relative to each other at any suitable relative orientation. For example, end segment 13 and end segment 9 are oriented relative to each other at an angle 14. The end segment 13 is configured to house a stopper (e.g., a stem) as described more fully below.

Figure 8:
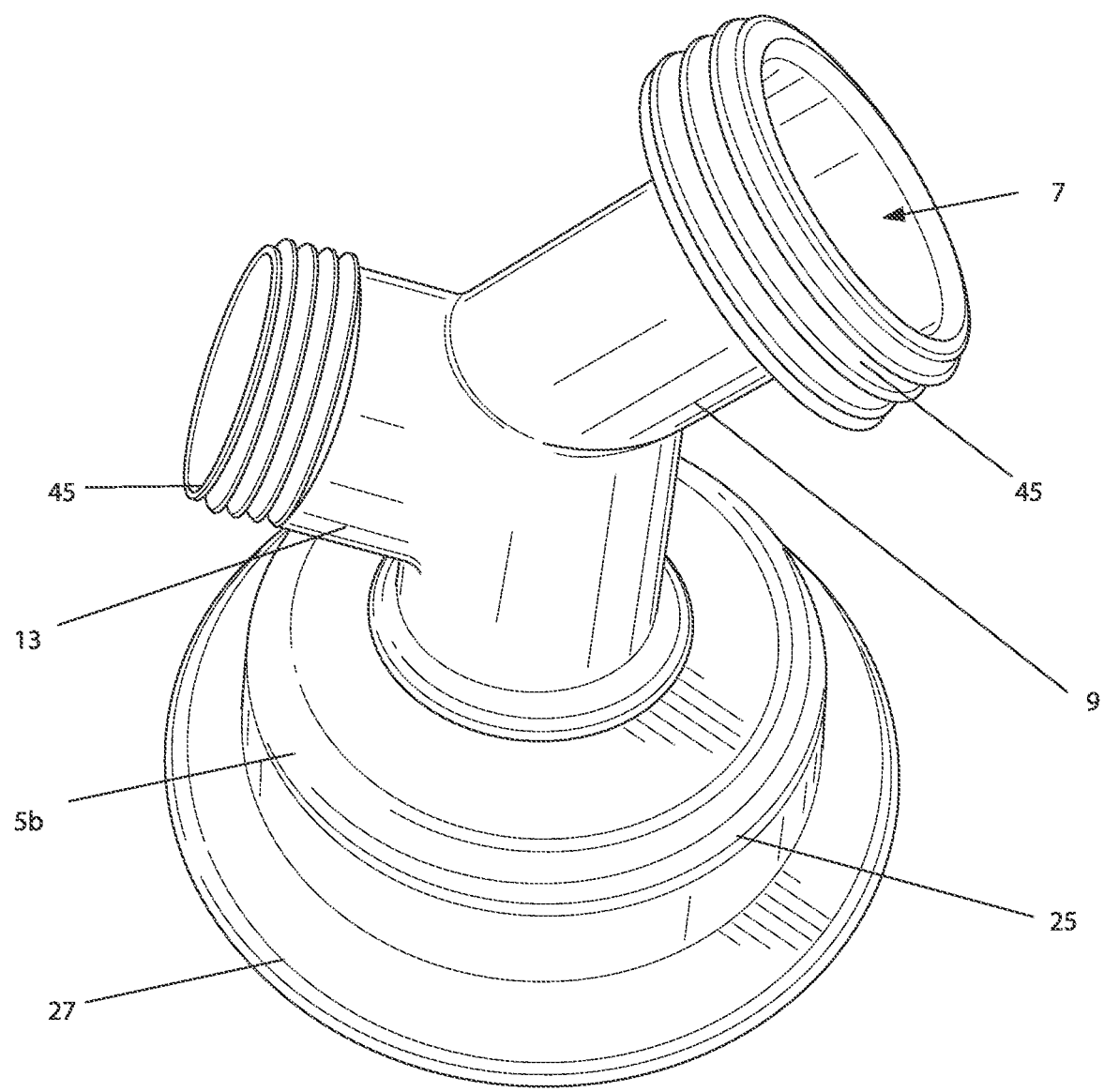
FIG. 8 shows a partially assembled valve according to another aspect of the method illustrated in FIG. 6.

End segment 9 (e.g., a nozzle) is fluidly connected to fluid channel 8 and includes the fluid outlet 7. End segment 9 is configured to allow a flow of fluid to a user. The end segment 9, according to one aspect, is configured such that a user may manipulate fluid flow delivered from fluid outlet 7 to a location other than the location of the body 5. For example, end segment 9 is configured such that a fluid flow device (e.g., a water hose) is securely attachable to the body 5. The end segment 9 may include threading 45, as shown in FIG. 8.

The body 5 also includes a lip 23 configured to house stopper 20 (which may also be referred to as a 'stem') as described more fully below. The body 5 also includes an inner segment 29, which is part of the fluid channel 8 disposed within an inner surface of the body 5 between the fluid 6 and the fluid outlet 7. The inner segment 29 is configured to receive a tubular member 35 (e.g., a tube liner) and a fitting 40 (such as a push-to-connect fitting), as described in more detail below.

The body 5 also includes a connector portion 25 formed integrally with the body 5 and disposed on an end of the body 5 corresponding with the fluid inlet 6 of the body 5. The connector portion 25 includes an inner wall 26 which defines at least a portion of the inner segment 29 of the body 5. The inner wall 26 includes a crimp 28 configured to secure the fitting 40 within the inner segment 29 of the body 5. As shown in FIG. 2, the crimp 28 is oriented in a direction toward the tubular member 35.

The connector portion 25 includes a lip 27 configured to be securely attachable to a structure located at an end of a pipe 42 (e.g., a wall of a building, represented by a dot-dash line in FIG. 2). The connector portion 25 surrounds at least part of the fitting 40, as described below. The connector portion 25 is configured, according to one example, to interface with an end of a pipe. According to one aspect, the connector portion 25 extends over and around a circumferential portion of the fitting 40, as shown in FIG. 2.

As mentioned above, valve 1 also includes a stopper (e.g., stem) 20. The stopper 20 is configured to seal the body 5 when the stopper 20 is in a first position (as shown in FIG. 2). FIG. 3 depicts a sillcock similar to that shown in FIG. 1, in which a stopper 20 is configured to allow fluid to flow through the inner channel 8 from the fluid inlet 6 to the fluid outlet 7 when the stopper 20 is in a second position. The stopper 20 is housed within an inner surface of the end segment 13 of the body 5. The stopper 20 is fluidly sealed within the end segment 13 of the body 5 at one end using a washer 21, which is secured to an end of the stopper 20 by a fastener (e.g., screw) 22.

The stopper 20 is fluidly sealed within the end segment 13 of the body 5 at another end using a washer 16 and a gasket 17 which are secured in place at an end of the end segment 13 by a packing nut 15 which is securably attachable to the threads 45 of the end segment 13. The stopper 20 is connected to a handle 10 (such as the wheel handle shown in FIGS. 1-3), which is securably attachable to the stopper 20 using a fastener (e.g., a screw) 12. Handle 10 also includes portion 11 which is configured to house a nameplate.

The valve 1 also includes fitting 40 which is integrated with the body 5. According to one example, fitting 40 is a push-to-connect fitting configured to allow for ease of installing the valve 1 onto an end of a pipe. Fitting 40 includes an inner diameter 41 configured to allow the fitting 40 to communicate the fluid inlet 6 of the body 5 with the end of the pipe. Fitting 40 is securably held in place within the connector portion 25 of the body 5 by the crimp 28 of the inner wall 26 of the body 5, such that the fitting 40 is integral to the body 5 of the valve 1. The fitting 40 is configured to provide a grip on the end of the pipe to secure the body 5 to the end of the pipe (e.g., at installation).

A tubular member (e.g., tube liner) 35 may optionally be disposed within the inner diameter 41 of the fitting 40 and also within the inner segment 29 of the body 5. The tubular member 35 may be provided in consideration of the mechanical strength of the type of pipe being connected. The tubular member 35 is configured to communicate with the end of the pipe and the fluid channel 8.

A sealing ring (e.g., O-ring) 30 is disposed within the inner segment 29 of the body 5. The sealing ring 30 is configured to fluidly seal the end of the pipe with the body 5, thereby allowing a fluid flow from the connected pipe to the fluid outlet 7 of the body 5. The fitting 40 grips the pipe and prevents the sealing ring 30 from extruding. The fitting 40 eliminates the requirement for a threaded joint to be employed and therefore mitigates the likelihood of a leak path being established.

Figure 4:
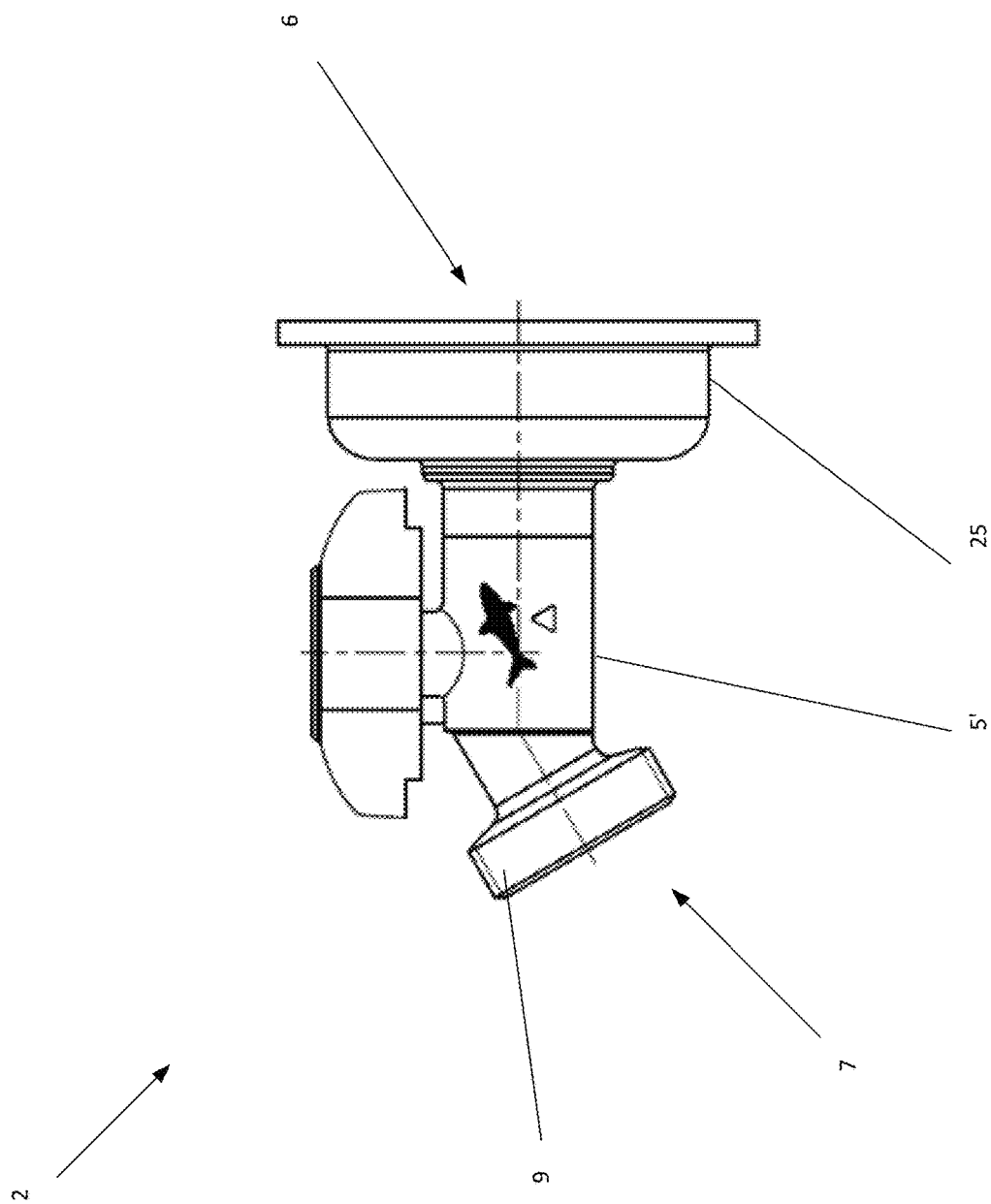
FIG. 4 is a side view of a sillcock, according to an exemplary implementation.
Figure 5:
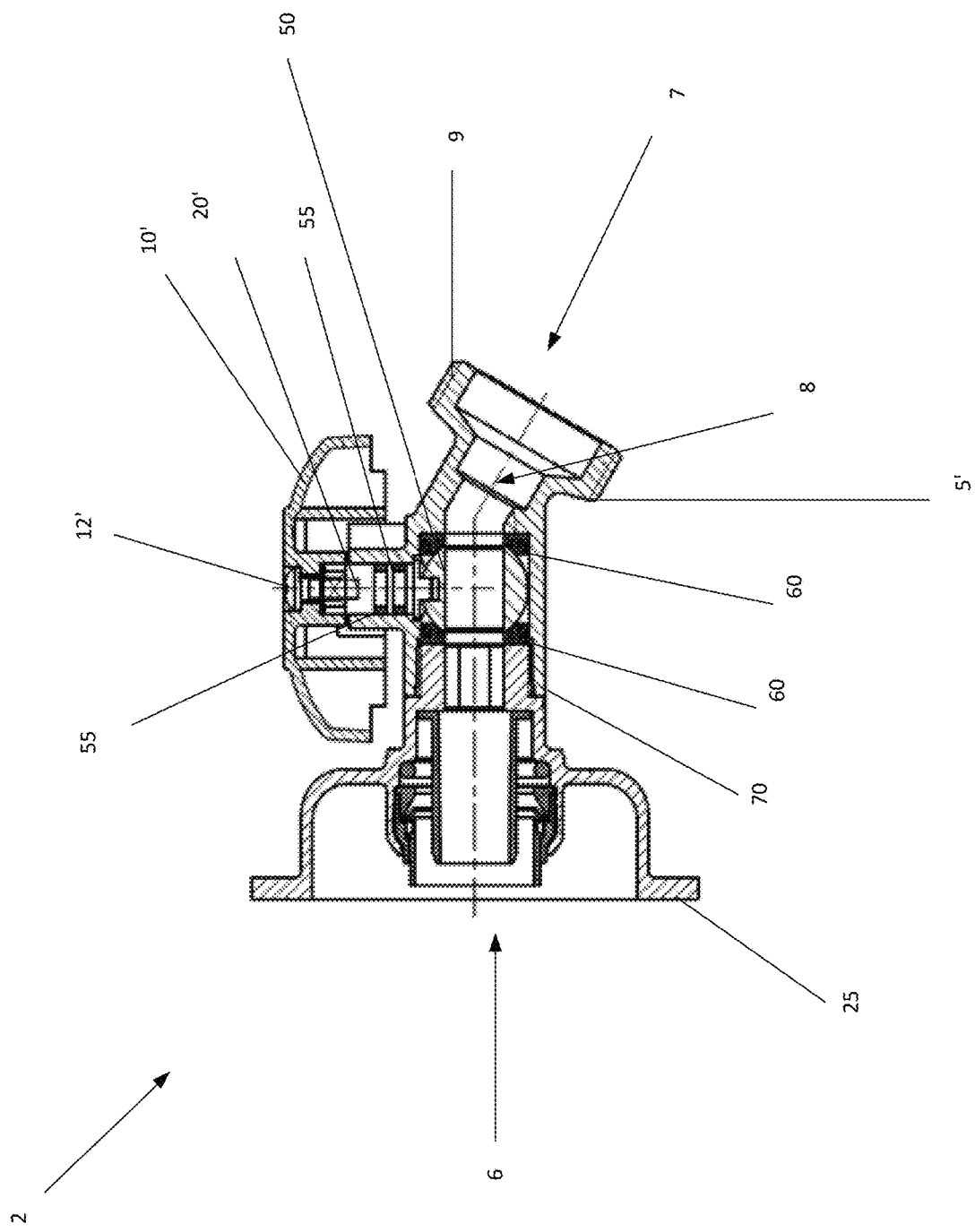
FIG. 5 is a side cross-sectional view of the sillcock shown in FIG. 4.

As shown in FIGS. 4-5, according to an exemplary implementation of the present disclosure, a valve (e.g., sillcock or faucet valve) 2 is provided. The valve 2 may include certain components present in valve 1, discussed above. Valve 2 includes a body 5', and the body 5' of valve 2 comprises a bonnet 70 configured to overlap and/or connect with the connector portion 25 of the valve 2. Bonnet 70 is configured to fluidly seal fluid channel 8 of the body 5' such that fluid flow through the connector portion 25 does not leak as the fluid flows to the fluid outlet 7 of the body 5'.

The valve 2 includes a stopper (e.g., stem) 20' configured to seal the body 5 when the stopper 20' is in a first position and configured to allow fluid to flow through the inner channel 8 from the fluid inlet 6 to the fluid outlet 7 when the stopper 20' is in a second position. The stopper 20 includes a ball portion 50 which is configured to be rotatable from the first position to the second position. In this manner, the body 5' is sealed when the ball portion 50 is in the first position and the body 5' is configured to receive a fluid flow therein when the ball portion 50 is in the second position.

The stopper 20' is fluidly sealed within the body 5' by one or more sealing rings (e.g., O-rings) 55; for example, two sealing rings 55 are shown in FIG. 5. The ball portion 50 of the stopper 20' is fluidly sealed within the fluid channel 8 by one or more sealing rings 60; for example, two sealing rings 60 are shown in FIG. 5. The two sealing rings 60 are parallel to and spaced apart from each other. The stopper 20' is connected to a handle 10' (for example, a wing handle) using a fastener (e.g., screw) 12'.

Figure 6:
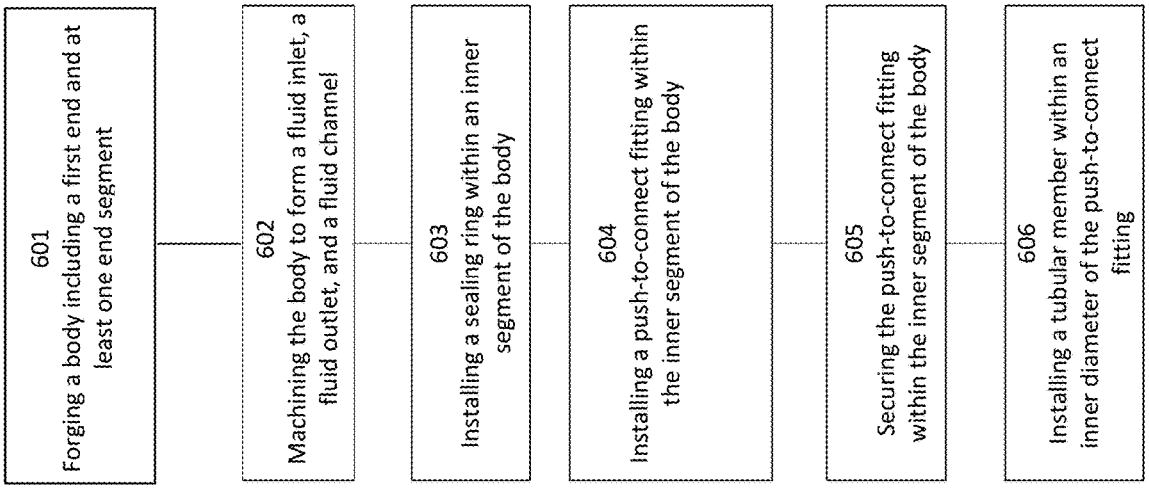
FIG. 6 is a process diagram illustrating a method of assembling a valve, according to an exemplary implementation.
Figure 7:
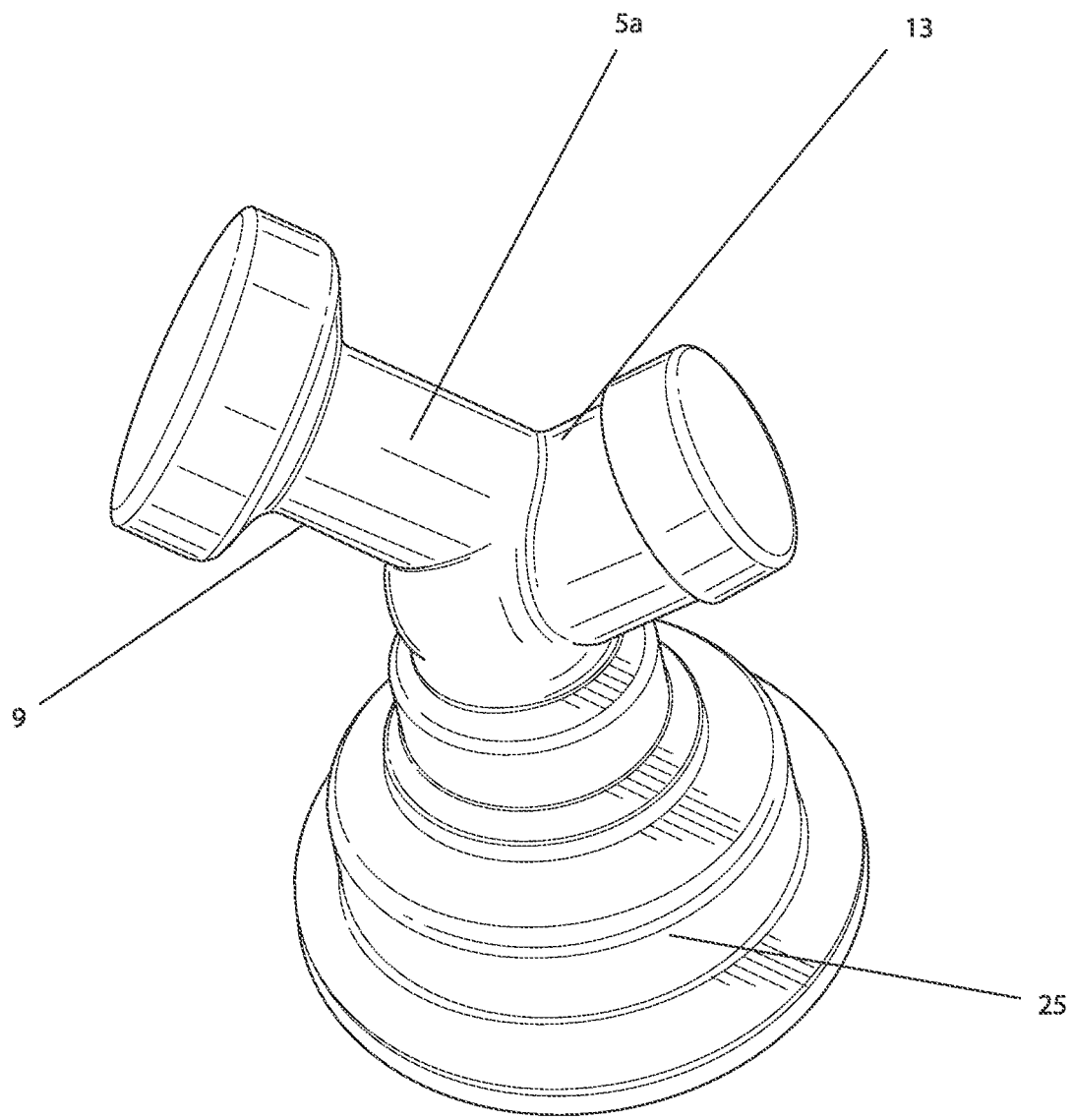
FIG. 7 shows a partially assembled valve according to one aspect of the method illustrated in FIG. 6.

FIG. 6 depicts a method 600 for manufacturing a valve according to an exemplary implementation of the present disclosure. The method 600 includes forging a body (step 601), the body comprising a first end and at least one end segment. As shown in FIG. 7, a rough forged body 5a of the valve is shown. The body may be formed in a single forging step, as opposed to a multi-step process.

Referring back to FIG. 6, the method 600 also includes machining the body to form a fluid inlet at the first end of the body, a fluid outlet at a first end segment, an inner segment 29, an inner wall 26, and an interior fluid channel defined by the first end and the at least one end segment (step 602). FIG. 8 depicts the machined body 5*b* according to an exemplary implementation. According to one aspect of the method 600, machining the body includes threading at least one end of the body 5*b* with threads 45 which allow a user to connect a fluid device (e.g., a hose) to the finished body of the valve to deliver fluid to a desired location.

The method 600 also includes installing a sealing ring (e.g., O-ring) within an inner segment of the body (step 603). The method 600 further includes installing a push-to-connect fitting within the inner segment of the body such that the push-to-connect fitting can secure itself to an inserted end of pipe at installation (604). The method 600 includes securing the push-to-connect fitting within the inner segment of the body by the crimp 28 formed in the inner wall 26 (step 605). The method 600 includes installing a tubular member 35 within an inner diameter of the push-to-connect fitting (step 606).

In at least one implementation, a method for assembling the end of the pipe with the push-to-connect fitting 40 is as follows. First, the end of the pipe is cut evenly, so as to ensure that the ends are square. Deburring or other finishing processes may be carried out to avoid leaving any rough edges that may damage components such as the sealing rings. Next, the depth is marked for accuracy, and the end of the pipe is then inserted through the push-to-connect fitting 40. Disassembly may be carried out by placing a disassembly clip around the exposed portion of the push-to-connect fitting 40, pushing the clip against the fitting, and pulling the end of the pipe with a twisting motion.

As utilized herein, the terms "approximately," "about," "substantially," and similar terms are intended to have a broad meaning in harmony with the common and accepted usage by those of ordinary skill in the art to which the subject matter of the disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

The terms "coupled," "connected," and the like are used herein to mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the Figures. It should be noted that the orientation of various elements may differ according to other exemplary implementations and that such variations are intended to be encompassed by the present disclosure.

It is to be understood that although the present invention has been described with regard to implementations thereof, various other implementations and variants may occur to those skilled in the art, which are within the scope and spirit of the invention, and such other implementations and variants are intended to be covered by corresponding claims. Those skilled in the art will readily appreciate that many modifications are possible (e.g., variations in sizes, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative implementations. Other substitutions, modifications, changes, and omissions may also be made in the design, operating conditions and arrangement of the various exemplary implementations without departing from the scope of the present disclosure.

With respect to the use of substantially any plural and/or singular terms herein, those having skill in the art can translate from the plural to the singular and/or from the singular to the plural as is appropriate to the context or application. The various singular/plural permutations may be expressly set forth herein for clarity.

The invention claimed is:

1. A valve assembly comprising:
  a body having a first end and a second end, the body including:
    a connector portion positioned at the first end;
    a nozzle portion positioned at the second end, the nozzle portion defining a fluid outlet; and
    an intermediate portion connecting the connector portion to the nozzle portion;
    wherein the connector portion includes:
      an inner peripheral wall having a first exterior surface, the inner peripheral wall including a first portion and a second portion, the first exterior surface having a first outer diameter in the first portion and a second outer diameter in the second portion greater than the first outer diameter such that an interface between the first portion and the second portion defines a stepped profile along the first exterior surface, wherein the second portion has a crimped end that defines a fluid inlet proximate the first end; and
      an outer peripheral wall extending from the inner peripheral wall toward the first end and at least partly around the crimped end of the second portion of the inner peripheral wall, the outer peripheral wall having a second exterior surface with a third outer diameter greater than the second outer diameter such that a space is formed between the second portion of the inner peripheral wall and the outer peripheral wall; and
    wherein the connector portion, the intermediate portion, and the nozzle portion cooperatively define a fluid flow path extending from the fluid inlet to the fluid outlet;
  a seal disposed within the second portion of the inner peripheral wall and positioned in the stepped profile at the interface between the first portion and the second portion;
  a push-to-connect fitting disposed within the second portion of the inner peripheral wall and extending through the fluid inlet, wherein the push-to-connect fitting is held within the inner peripheral wall by the crimped end of the second portion of the inner peripheral wall; and a stopper assembly coupled to the body along the intermediate portion, the stopper assembly configured to facilitate selectively restricting a flow of fluid along the fluid flow path.

2. The valve assembly of claim 1, further comprising a liner disposed within the inner peripheral wall and extending at least partially through the push-to-connect fitting.

3. The valve assembly of claim 2, wherein the liner is configured to be received within an end of a pipe when the connector portion is secured to the pipe.

4. The valve assembly of claim 1, wherein the outer peripheral wall terminates with a lip extending perpendicular to and radially outward from the second exterior surface such that the lip has a fourth outer diameter greater than the third outer diameter of the second exterior surface, and wherein the lip is configured to facilitate attaching the connector portion to a structure into which a pipe extends.

5. The valve assembly of claim 1, further comprising a liner disposed within the connector portion and extending at least partially through the push-to-connect fitting.

6. The valve assembly of claim 5, wherein the liner is configured to be received within an end of a pipe when the connector portion is secured to the pipe.

7. The valve assembly of claim 1, wherein the nozzle portion includes a threaded end portion.

8. The valve assembly of claim 1, wherein the nozzle portion extends at a downward angle from the intermediate portion.

9. The valve assembly of claim 1, wherein the stopper assembly includes a stopper positioned along the fluid flow path, and wherein the stopper is selectively repositionable between a first position that blocks the fluid flow path and a second position that does not block the fluid flow path.

10. The valve assembly of claim 9, wherein the stopper is selectively rotatable between the first position and the second position.

11. The valve assembly of claim 9, wherein the stopper is selectively translatable between the first position and the second position.

12. The valve assembly of claim 9, wherein the stopper assembly includes a handle that facilitates selectively repositioning the stopper between the first position and the second position.

13. The valve assembly of claim 1, wherein the connector portion, the intermediate portion, and the nozzle portion have a unitary, integral structure.

14. The valve assembly of claim 1, wherein the connector portion, the intermediate portion, and the nozzle portion have a multi-piece structure.

15. A valve body comprising:
a connector portion including:
an inner peripheral wall having a first exterior surface, the inner peripheral wall including a first portion and a second portion, the first exterior surface having a first outer diameter in the first portion and a second outer diameter in the second portion greater than the first outer diameter such that an interface between the first portion and the second portion defines a stepped profile along the first exterior surface, wherein the second portion has a crimped end that defines a fluid inlet; and
an outer peripheral wall extending from the inner peripheral wall and at least partly around the crimped end of the second portion of the inner peripheral wall, the outer peripheral wall having a second exterior surface with a third outer diameter greater than the second outer diameter such that a space is formed between the second portion of the inner peripheral wall and the outer peripheral wall, wherein the outer peripheral wall terminates with a lip extending perpendicular to and radially outward from the second exterior surface such that the lip has a fourth outer diameter greater than the third outer diameter of the second exterior surface;
a nozzle portion defining a fluid outlet; and
an intermediate portion connecting the connector portion to the nozzle portion;
the connector portion, the intermediate portion, and the nozzle portion define a fluid flow path extending from the fluid inlet to the fluid outlet.

16. The valve body of claim 15, wherein at least one of:
the fluid inlet of the inner peripheral wall is configured to receive a fitting, and the crimped end of the inner peripheral wall is configured to secure the fitting within the inner peripheral wall; or
the inner peripheral wall is configured to receive and hold a tube liner that extends at least partially through the fitting.

17. A sillcock comprising:
a body including:
a connector portion including:
an inner peripheral wall having a first exterior surface, the inner peripheral wall including a first portion and a second portion, the first exterior surface having a first outer diameter in the first portion and a second outer diameter in the second portion greater than the first outer diameter such that an interface between the first portion and the second portion defines a stepped profile along the first exterior surface, wherein the second portion has a crimped end that defines a fluid inlet; and
an outer peripheral wall extending from the inner peripheral wall and at least partly around the crimped end of the second portion of the inner peripheral wall, the outer peripheral wall having a second exterior surface with a third outer diameter greater than the second outer diameter such that a space is formed between the second portion of the inner peripheral wall and the outer peripheral wall;
a nozzle portion defining a fluid outlet; and
an intermediate portion connecting the connector portion to the nozzle portion;
the connector portion, the intermediate portion, and the nozzle portion define a fluid flow path extending from the fluid inlet to the fluid outlet;
a fitting disposed within the inner peripheral wall and extending through the fluid inlet, wherein the fitting is held within the inner peripheral wall by the crimped end of the second portion, and wherein the fitting is configured as a push-to-connect fitting that interfaces with an end of a pipe to facilitate securing the connector portion to the pipe;
a liner disposed within the inner peripheral wall and extending at least partially through the fitting, wherein the liner is configured to be received within the end of the pipe when the connector portion is secured to the pipe; and
a valve positioned along the fluid flow path to facilitate selectively restricting a flow of fluid along the fluid flow path.

* * * * *